(12) United States Patent
Peyre

(10) Patent No.: US 6,536,304 B2
(45) Date of Patent: Mar. 25, 2003

(54) AUTOMATIC SECUREMENT DEVICE AND CYCLIST'S PEDAL PROVIDED WITH SUCH A DEVICE

(75) Inventor: Henri Peyre, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 09/828,142

(22) Filed: Apr. 9, 2001

(65) Prior Publication Data

US 2002/0007696 A1 Jan. 24, 2002

(30) Foreign Application Priority Data

Apr. 7, 2000 (FR) .............................................. 00 04452

(51) Int. Cl.⁷ .............................. G05G 1/14; A43B 5/00
(52) U.S. Cl. ........................ 74/594.6; 74/594.4; 36/131
(58) Field of Search ............................. 74/594.4, 594.6; 36/131

(56) References Cited

U.S. PATENT DOCUMENTS

| 5,142,938 A | * | 9/1992 | Sampson .................... 74/594.6 |
| 5,423,233 A | * | 6/1995 | Peyre et al. ................ 74/594.6 |
| 5,557,985 A | * | 9/1996 | Nagano ....................... 74/594.6 |
| 5,787,764 A | * | 8/1998 | Peyre ....................... 74/594.4 X |
| 5,943,795 A | * | 8/1999 | Ueda et al. .................... 36/131 |
| 5,992,266 A | * | 11/1999 | Heim ......................... 74/594.6 |
| 6,244,136 B1 | * | 6/2001 | Chen .......................... 74/594.6 |
| 6,374,699 B1 | * | 4/2002 | Peyre ......................... 74/594.6 |

FOREIGN PATENT DOCUMENTS

| EP | 0 393 585 | | 10/1990 | | |
| EP | 0 568 109 | | 11/1993 | | |
| GB | 2202499 A | * | 9/1988 | ............... 74/594.6 |
| JP | 2000-142537 | * | 5/2000 | ............... 74/594.6 |
| WO | WO 88/04802 | * | 6/1988 | ............... 74/594.6 |

* cited by examiner

*Primary Examiner*—Vinh T. Luong
(74) *Attorney, Agent, or Firm*—Young & Thompson

(57) ABSTRACT

Device adapted for the automatic securement of a cyclist's shoe on a bicycle pedal, particularly for an all terrain bicycle includes on the one hand a chock (4) secured to a shoe sole (5) and disposed in a hollow of the sole having lateral edges extending on opposite sides of the chock (4), and on the other hand a front fixed claw and a rear movable claw (6) disposed on the pedal and adapted to secure the chock to the pedal. Each claw is adapted to coact with a female configuration disposed respectively at the front and the rear of the chock. The rear movable chock (6) is disposed between two fixed projecting members (22, 23) forming simultaneously a non-rearward return abutment and a lateral slope (26, 27) adapted to coact with the side edge (28, 29) of the hollow (7) of the sole (5) for the lateral disengagement of the shoe by lateral pivoting of the shoe.

10 Claims, 2 Drawing Sheets

AUTOMATIC SECUREMENT DEVICE AND CYCLIST'S PEDAL PROVIDED WITH SUCH A DEVICE

BACKGROUND OF THE INVENTION

The present invention relates to an automatic securement device for a cycle pedal, particularly but not exclusively, for an all terrain cycle pedal. It also relates to a pedal provided with such a device.

DESCRIPTION OF THE RELATED ART

Automatic cycle pedals of this type are known, comprising a front securement member constituted by a claw forming an abutment to engage the front male end of a hooking member in the form of a plate forming a chock generally disposed in a hollow of the sole of a cyclist's shoe, and a rear male engagement member constituted by a movable claw to engage a rear female end of the securement member.

On known pedals of this type, a male configuration at the front end of the chock is thus received in a female configuration of the front engagement member of the pedal.

The rear claw is mounted pivotably about an axle and is prestressed by resilient means toward an engagement position whilst being displaceable under the pressure of the shoe of the cyclist, between an open spaced position permitting the insertion of the chock between the two claws and a closed engagement position ensuring the securement of the chock with the automatic pedal.

The resilient means is generally constituted by a helical spring and the rear claw can be moved forcibly against the action of the spring, toward its open position to disengage the chock from its engagement between the claws. This movement of the rear claw is effected with the rear end of the chock whose female configuration has oblique side walls forming cams which, during rotation of the shoe outwardly, presses back the claw rearwardly. This movement of the rear claw toward the open position can moreover be obtained in the same manner during rotation of the shoe inwardly, for example if the cyclist falls. The tension of the spring can generally be adjusted with the help of an adjustment screw to modify the force necessary to disengage the shoe.

There is also known from French patent application 5 99.0914 in the name of the applicant, an automatic cyclist pedal, in particular for an all terrain cycle. This automatic pedal is a double surface retention pedal.

In this pedal, the rear movable member for engagement of the hooking element constitutes a resilient member fixed flush on the body of the pedal and working by bending between a bent release position for the hooking element and a retaining position of the latter against a retaining surface on the body of the pedal. The tension of this resilient element can be adjusted by movement of a plate whose upper edge defines the bend line of the resilient element.

On the chock that is used, the front and rear ends of said element are ends with a female configuration adapted to be by tongs between the front and rear male engagement members of the automatic pedal.

In this type of pedal, in which the chock is located in a recess or hollow of the sole, there are however sometimes problems for the disengagement of the shoe, whether such disengagement is triggered by the cyclist who rotates his foot outwardly, or whether it is triggered by the fall of the cyclist during which one of his feet can be caused to pivot inwardly or toward the inside. This is all the more critical for pedals in practice on all terrain cycles where falls are more frequent.

In existing pedal, there is also the need to facilitate the engagement of the chock between the claws during engaging the shoe, by reducing the force required from the cyclist.

SUMMARY OF THE INVENTION

The object of the invention is to provide a pedal adapted to overcome the drawbacks of pedals that are already known, by providing a securement device permitting easy engagement of the chock on the pedal and which at the same time reduces the forces necessary for engaging and disengaging the shoe, whilst ensuring the holding of the chock in an effective manner between the engagement elements.

The invention has for its object a device for the automatic securement of a cyclist's shoe on a bicycle pedal, particularly for an all terrain bicycle, comprising in combination:

on the one hand a plate forming a chock secured to a shoe sole and disposed in a hollow of the latter, comprising side edges extending on opposite sides of the chock, on the other hand securement means disposed on the pedal and adapted to secure said chock to the pedal, said securement means on the pedal comprising a fixed front engagement member and a rear movable engagement member each having a male configuration adapted to coact with a female configuration disposed at the front respectively the rear of the chock, characterized in that the rear movable engagement member is disposed between two fixed projecting members forming simultaneously a non-return abutment toward the rear and lateral slope adapted to coact with a side edge of said hollow of the shoe for the lateral engagement of the shoe by lateral pivoting of the shoe.

According to other characteristics of the invention:

said projecting members on the pedal body have a height such that the rear movable engagement member will be substantially level with the projecting members;

the rear movable engagement member has an opposite sides of its body a slight play relative to the two projecting members;

the angle of inclination of the slope is of the order of 45°;

each of said projecting members has a rearwardly inclined abutment surface;

the angle of inclination to the vertical is about 3°;

the chock is held between the front and rear engagement members with play, permitting a certain freedom of movement of the chock in translation in the longitudinal direction of the pedal body against the action of a resilient means (12), and this freedom of longitudinal movement has a value less than the engagement of the portion of the chock below the front engagement means so as to prevent the untimely disengagement of the shoe rearwardly during upward swinging of the latter.

Another object of the invention is a pedal provided with a securement device according to the invention.

BRIEF DESCRIPTION OF THE DRAWINGS

The invention will now be described in greater detail with the help of non-limiting example of an embodiment of the pedal according to the invention, with reference to the accompanying drawings, in which.

DESCRIPTION OF THE PREFERRED EMBODIMENTS

Figure 1:
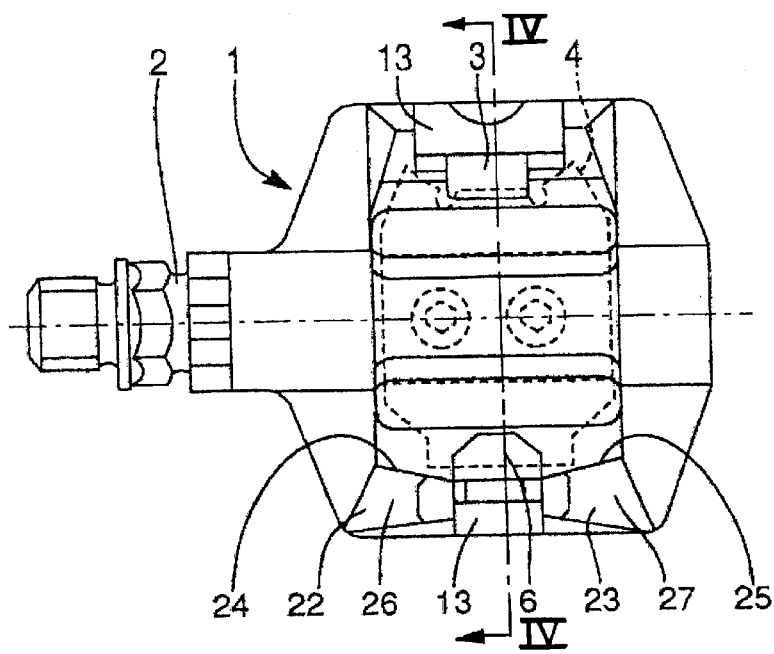
FIG. 1 is a top plan view of a right pedal provided with a securement device according to the invention.
Figure 2:
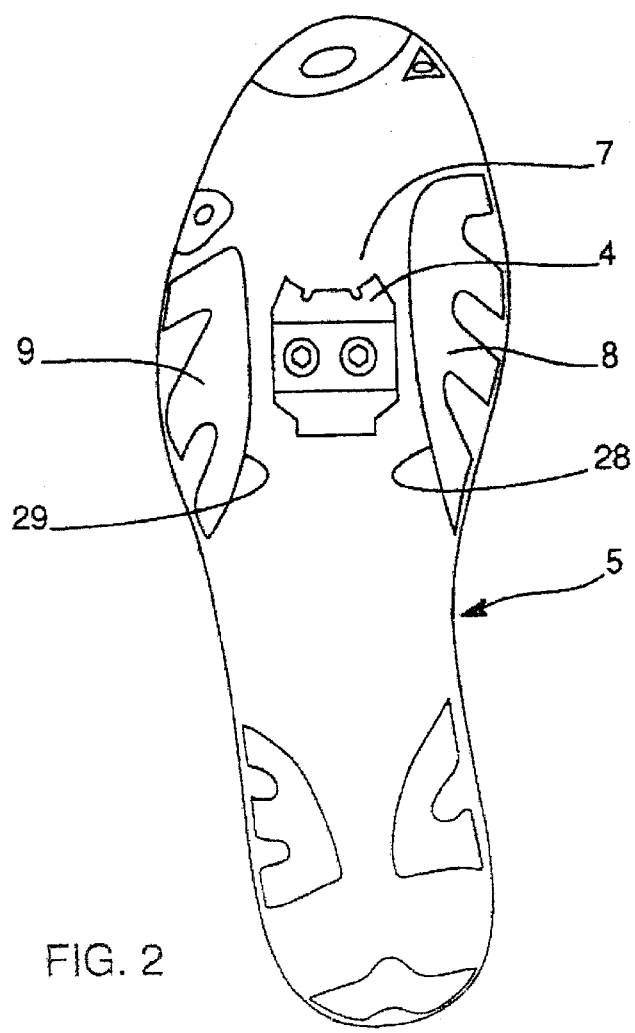
FIG. 2 is a bottom plan view of the sole of a shoe for an all terrain cyclist in which the chock is located in a recess between two bearing surfaces.
Figures 3, 4:
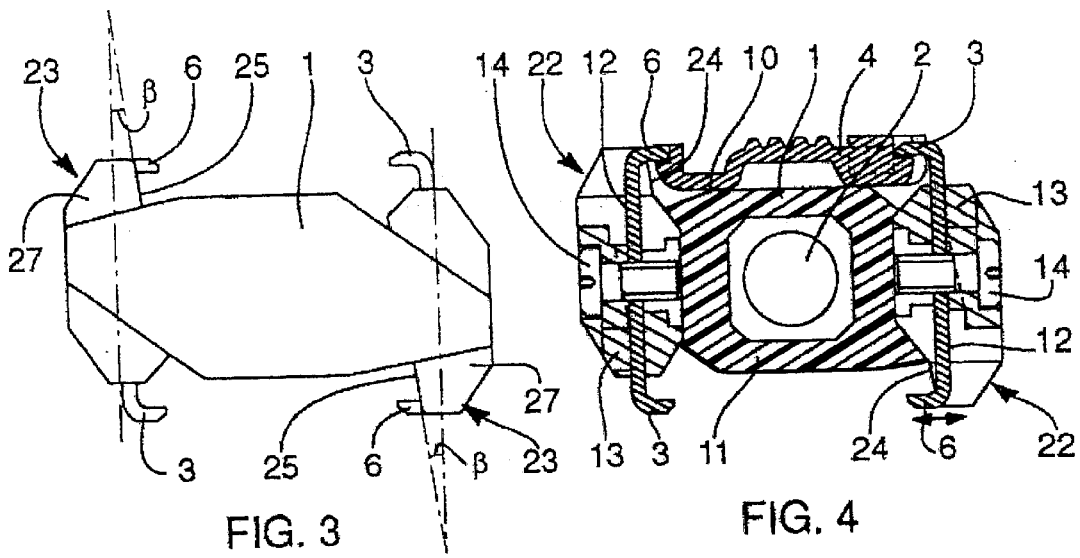
FIG. 3 is a side view showing the fixed projecting members according to the invention and the angle of the anti-return abutment surface of these members.
FIG. 4 is a central cross-section of the pedal, perpendicular to the axis of the pedal.

FIGS. 1, 3 to 5 show a pedal provided with the securement device according to the invention. The pedal comprises a pedal body 1, preferably of plastic material, in which a pedal axle 2 is disposed in bearings (not shown) so as to permit the rotation of the pedal during pedaling. The pedal axle 2 is connected by screwing to a pedal crank (not shown).

The body of the pedal 1 is provided with a front fixed member 3 for engagement with a plate forming a chock 4 fixed below the sole 5 of a cyclist's shoe (not shown) and a rear movable member 6 for engagement of this chock. Rear movable member 6 is movable in the direction indicated by the arrow shown in FIG. 4. The sole 5 comprises a certain number of bearing surfaces that project from the sole properly so-called. The chock 4 is fixed in a recess 7 between two bearing surfaces 8 and 9.

In the illustrated example, the pedal is of the type with a double retention plane 10, 11 of the chock 4. The pedal is provided with two opposite elements of which each constitutes the fixed front member 3 on one of the two retention planes and the rear movable member 6 on the other retention plane.

Each element 12 is constituted by a resilient metal blade which extends over all the thickness of the pedal body 1 and which projects on opposite sides of the latter. The ends of each element 12 are shaped as hooks directed inwardly so as to constitute engagement members properly so called in the two retention planes.

Each blade 22 is embedded in the pedal body 1 and gripped against the latter with a plate 13 disposed outside the blade. The plate 13 is fixed to the pedal body 1 by means of a screw 14 extending through a slot 39 provided in the plate 13 and a hole provided in the blade 12 to be screwed into a nut immersed in the pedal body 1.

The screw head is disposed in a groove provided in the lower external portion of the plate 13.

So as to adjust the stiffness of the blade 12, the length of its lever arm can be modified by vertical movement of the plate 13.

According to the invention, the securement device moreover comprises two fixed projecting members 22, 23, disposed on opposite sides of the rear movable engagement member 6. These two projecting members have a height such that the rear engagement member 6 will be substantially level with the relief members so that the engagement member will not project above these members. There is thus avoided an untimely engagement of the rear claw 6.

For the same purpose, the respective play between the rear engagement member 6 and the two fixed projecting members 22, 23 is relatively small.

Each projecting member 22, 23 comprises a respective non-return abutment surface 24, 25. This abutment surface preferably forms an angle β with the vertical (see FIG. 3). The angle β is of the order of 3° and serves to facilitate the emplacement of the chock 4 between the claws 3 and 6 during engagement of the shoe.

Each projecting member 22, 23 moreover comprises a respective lateral slope 26, 27 adapted to coact with a respective side edge 28, 29 delimiting the hollow 7 in which the chock 4 is disposed. The angle of inclination α of the slopes 26, 27 is of the order of 45°.

Figure 5A:
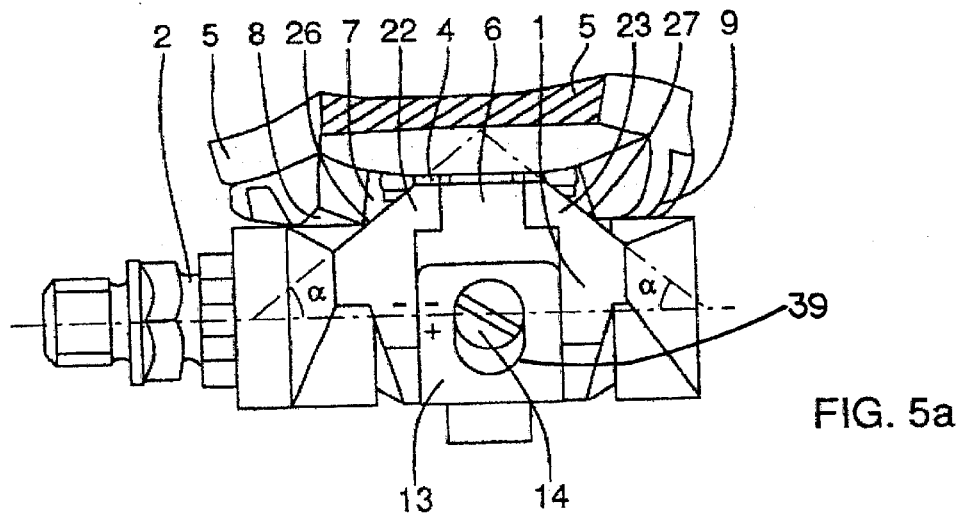
FIG. 5a is a rear view of a pedal, showing a shoe in the pedaling position.

FIG. 5a shows that when the chock is fixed between the claws in the pedaling position, the bearing surfaces 8, 9 rest against the upper surface of the body of the pedal 1 and that they are located very close to the respective projecting members or that they are contiguous to the latter, as is shown in FIG. 5a.

Figure 5B:
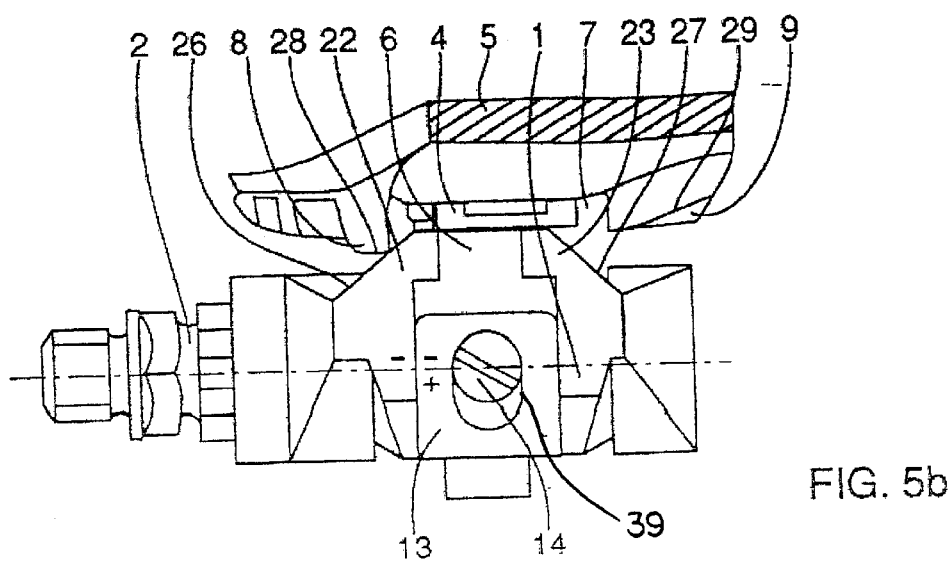
FIG. 5b is a rear view of a pedal, showing a show substantially disengaged by outward pivoting movement of the shoe.

FIG. 5b shows a shoe pivoted outwardly in the final phase of disengagement movement of the chock 4 from its engagement with the claws 3, 6. This operation is well known per se and will not be described in detail here. It can however be noted on this figure that the edge 28 delimiting the bearing surface 8 toward the interior, is always located in contact with the slope 28 of the projecting member 8 after having mounted this slope which during disengagement serves as a cam moving the corresponding portion of the sole upwardly thereby to facilitate the disengagement movement.

Moreover, the chock 4 is held between the front and rear engagement members with play, permitting a certain freedom of movement of the chock in translation in the longitudinal direction of the pedal body 1. Preferably, the freedom of longitudinal movement has a value less than the engagement of the portion of the chock below the front engagement means, so as to prevent the untimely disengagement of the shoe rearwardly during swinging of the latter upwardly.

There is thus obtained a securement device permitting the easy engagement and disengagement of the chock 4 on the pedal and which at the same time reduces the forces necessary for engaging and disengaging the shoe, whilst ensuring the holding of the chock in an effective manner between the engagement elements.

The invention also relates to all pedals provided with the securement device according to the invention.

Other embodiments are possible without thereby departing from the scope of the invention. The invention could for example without difficulty be applied to a pedal with a single retaining surface.

What is claimed is:

1. Automatic securement device for a shoe on a bicycle pedal, comprising in combination:

on the one hand a plate forming a chock (4) secured to a sole (5) of a shoe and disposed in a hollow (7) of the sole comprising lateral edges (28, 29) extending on opposite sides of the chock (4), on the other hand securement means (3, 6) disposed on a pedal body (1) and adapted to secure said chock (4) to the pedal body, said securement means to the pedal comprising a front fixed engagement member (3) and a rear movable engagement member (6) each having a male configuration adapted to coact with a female configuration disposed respectively at the front and at the rear of the chock (4), wherein the rear movable engagement member (6) is disposed between two fixed projecting members (22, 23) forming simultaneously a non-rearward return abutment (24, 25) and a lateral slope (26, 27) adapted to coact with a side edge (28, 29) of said hollow (7) of the sole (5) for the lateral disengagement of the shoe by lateral pivoting of the shoe.

2. Securement device according to claim 1, characterized in that said projecting members (22, 23) on the pedal body (1) have a height such that the rear movable engagement member (6) will be substantially level with the projecting members (22, 23).

3. Securement device according to claim 1, characterized in that the rear movable engagement member (6) has on opposite sides of its body a slight play respectively relative to the two projecting members (22, 23).

4. Securement device according to claim 1, characterized in that the angle of inclination of the slope (26, 27) is of the order of 45°.

5. Securement device according to claim 1, characterized in that each of said relief members (22, 23) has an abutment surface (24, 25) inclined rearwardly.

6. Securement device according to claim 5, characterized in that the angle of inclination to the vertical (4) is of the order of 3°.

7. Securement device according to claim 1, characterized in that the chock (4) is held between the front and rear engagement members (3, 6) with play permitting a certain freedom of movement of the chock (4) in translation in the longitudinal direction of the pedal body (1) against the action of resilient means (12), and in that this freedom of longitudinal movement has a value less than the engagement of the portion of the chock (4) below the front engagement means (3) so as to prevent the untimely disengagement of the shoe rearwardly during swinging of the latter upwardly.

8. Cycle pedal characterized in that securement device is as claimed in claim 1.

9. Cycle pedal, comprising an automatic securement device for a cyclist's shoe on a bicycle pedal, comprising in combination:

on the one hand a plate forming a chock (4) secured to a sole (5) of a shoe and disposed in a hollow (7) of the sole comprising lateral edges (28, 29) extending on opposite sides of the chock (4), on the other hand securement means (3, 6) disposed on the pedal body (1) and adapted to secure said chock (4) to the pedal body, said securement means on the pedal comprising a front fixed engagement member (3) and a rear movable engagement member (6) each having a male configuration adapted to coact with a female configuration disposed respectively at the front and at the rear of the chock (4), wherein the rear movable engagement member (6) is disposed between two fixed projecting members (26, 27) adapted to coact with a side edge (28, 29) of said hollow (7) of the sole (5) for lateral disengagement of the shoe by lateral pivoting of the shoe.

10. Automatic securement device for a shoe on a bicycle pedal, comprising in combination:

a plate forming a chock (4) secured to a sole (5) of a shoe and disposed in a hollow (7) of the sole comprising lateral edges (28, 29) extending on opposite sides of the chock (4); and a securement means (3, 6) disposed on a pedal body (1) and adapted to secure said chock (4) to the pedal body, said securement means comprising a front engagement member (3) and a rear engagement member (6) each having a male configuration adapted to coact with a female configuration disposed respectively at the front and at the rear of the chock (4), wherein the rear engagement member (6) is disposed between two fixed projecting members (22, 23) forming simultaneously a non-rearward return abutment (24, 25) and a lateral slope (26, 27) adapted to coact with a side edge (28, 29) of said hollow (7) of the sole (5) for the lateral disengagement of the shoe by lateral pivoting of the shoe.

* * * * *